Jan. 13, 1931.  G. F. COLBERT ET AL  1,788,562
ORNAMENTAL MIRROR AND PROCESS OF MAKING IT
Filed Feb. 16, 1929
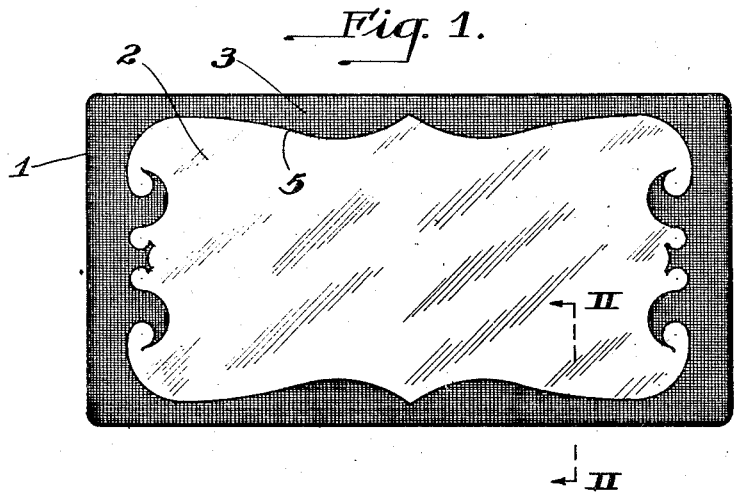
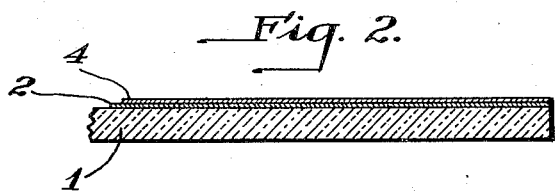
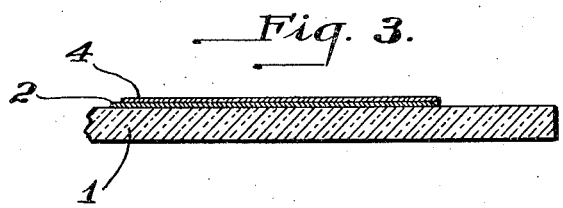
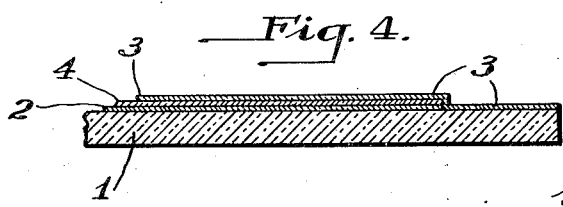
INVENTORS
George F. Colbert and
Wm. H. Colbert
by James L. Bradley
atty.

Patented Jan. 13, 1931

1,788,562

UNITED STATES PATENT OFFICE

GEORGE F. COLBERT AND WILLIAM H. COLBERT, OF PITTSBURGH, PENNSYLVANIA, ASSIGNORS TO LIBERTY MIRROR WORKS, A CORPORATION OF PENNSYLVANIA

ORNAMENTAL MIRROR AND PROCESS OF MAKING IT

Application filed February 16, 1929. Serial No. 340,378.

The invention relates to an ornamental mirror and the process of making it. It has for its principal objects the provision of mirrors of unusual and artistic appearance in which the entire area is reflective, the provision of a mirror having the appearance of a very expensive mirror, which can be made at a low cost comparable with that of the ordinary silvered mirror, and the provision of an improved method for fabricating the mirror at a relatively lost cost. One embodiment of the mirror and the method of making it is shown in the accompanying drawings, wherein:

Figure 1 is a face view of the mirror. And Figs. 2 to 4 are sectional views on the line II—II of Fig. 1, illustrating the steps of the process, the thickness of the glass and the backing films being exaggerated in order to make the showing clearer.

Referring to the drawings, 1 is a sheet of transparent material, such as glass, 2 is a precipitated film, preferably of a white metal, or a compound thereof, such as silver or mercury which covers the main or body portion of one surface of the glass, and 3 is a precipitated film of a metal or metal compound contrasting in color to that of the film 2, such as lead sulphide. The two films are arranged, as indicated in Fig. 1, so as to give an ornamental design. The design shown is, for the purposes of illustration, of very simple character, but it will be understood that very elaborate and artistic designs of infinite variety may be produced by the use of the films, two or more in number, of contrasting colors or shades. The films are not limited to the metals specified above, as it is practicable to precipitate other metals or compounds thereof in order to give different color combinations, such as gold, copper, platinum, etc. It is also possible to make the film 3 very thin and translucent and apply coloring material behind this film in the form of a lacquer or paint which gives the desired opacity to the film and also the desired tint.

In carrying out the process in the preferred form, the glass 1 is placed in a horizontal position and its upper surface covered with a layer of solution containing silver which is caused to precipitate over the entire surface forming the thin film 2, the procedure being well-known in the art.

This film 2 is then covered with a sheet of lead foil 4 secured in place by a thin film of adhesive; such as, asphaltum (Fig. 2).

After the asphaltum has dried, the outline 5 of the border 3 (Fig. 1) is marked on the foil with a pencil or by the aid of a stencil, and by the use of a knife or needle point, the foil is cut along such outline 5 and the foil covering the portion 3 peeled off, thus exposing the asphaltum therebeneath. The asphaltum thus exposed is now removed by the use of a solvent, such as turpentine, so that only the film of silver remains on this portion of the glass. The silver is next removed by rubbing and brushing, thus leaving the border portion of the glass corresponding to the border 3 uncovered, as shown in Fig. 3.

The next step involves the deposit of the lead sulphide design 3, heretofore referred to. To accomplish this, the glass is again placed in a horizontal position, and a coating of metallic lead sulphide is deposited by precipitation on the exposed border portion of the back and also over the lead foil 4 covering the rest of the back, as shown in Fig. 4, thus completing the process. The process pursued in depositing the lead sulphide is preferably that set forth in our Patent No. 1,662,565. As heretofore stated, the layers 2, 3 and 4, as shown in Figs. 2 to 4 are much exaggerated in thickness, in order that the relation of the films may be readily seen in the drawing; and, as shown in Fig. 4, this indicates a backing which is much thinner in the edge part 3 than in the center part, with an abrupt departure or shoulder between the parts; but as a matter of fact, the films are all so thin that there is no difference in thickness observable at the border part 3, as compared with the part lying inside the part 3.

The use of the sheet of foil 4 permits the line of departure 5 between the two coatings 2 and 3 to be made sharp and clear, as the lead sulphide film 3 will merge into the lead foil, while without such foil, the lead sulphide film will not approach closely to the edge of the silver coating and the line 5 between the two coatings is rough and blurred, lacking clearness of definition.

In case the coating 3 is to be of precipitated gold, instead of lead sulphide, the procedure is the same as above described, except that aluminum foil must be substituted for the lead foil. The gold will precipitate sharply up to the edge of the aluminum foil, just as the lead sulphide will precipitate sharply up to the edge of the lead foil, as heretofore set forth.

In any case where one metal film is to be precipitated on another film which has already been deposited, there is a tendency of the second film to mix with the deposited film and produce a discoloration, so that for this reason it is desirable in all cases to have a protecting coating between the two films, such as the foils above specified or one of some other suitable composition which will perform the separating function.

What we claim is:

1. As an article of manufacture, a mirror comprising a transparent glass sheet having on the rear surface thereof, which is plain throughout, a precipitated film of silver covering the main portion of the surface, a protecting coating over the film and a second precipitated film of a darker metal covering said coating and the remaining portion of said surface and forming an ornamental design.

2. As an article of manufacture, a mirror comprising a transparent glass sheet having on the rear surface a precipitated film of white metal covering one portion of the said surface, a protecting coating over the film and a second precipitated film of a darker metal covering said coating and the remaining portion of the said surface and forming an ornamental design.

3. As an article of manufacture, a mirror comprising a transparent glass sheet having on the rear surface a precipitated film of silver covering the main portion of the said surface, a protecting coating over the film and a second precipitated film of a lead compound covering said coating and other portions of the said surface and forming an ornamental design.

4. A process of forming a mirror, which consists in precipitating a metallic film on the face of a transparent sheet of glass, applying a protecting coating over said film removing a portion of the coating and film to form an ornamental design, and then precipitating on the uncovered surface of the glass and on the coating another metallic film of a different color than the first film.

5. A process of forming a mirror, which consists in precipitating a metallic film on the face of a transparent sheet of glass, pasting a metal foil over the metallic film, removing a portion of the foil and the film therebeneath to form an ornamental design, and then precipitating on the uncovered surface of the glass a second metallic film of a different color than the first film.

6. A process of forming a mirror, which consists in precipitating a film of silver on one face of a transparent sheet of glass, pasting a sheet of lead foil over said film, removing a portion of the foil and the film therebeneath to form an ornamental design, and then precipitating on the uncovered surface of the glass a second film of lead compound.

7. As an article of manufacture, a mirror comprising a transparent glass sheet having a plain area on its rear face with a precipitated metallic film covering a portion of said plain area and constituting an ornamental design, a protecting coating extending over the film and attached thereto, and a second metallic film extending over said coating and the remaining portion of said area, one of said films being of silver and the other of lead sulphide.

In testimony whereof, we have hereunto subscribed our names.

GEORGE F. COLBERT.
WILLIAM H. COLBERT.